(12) United States Patent
Abouatallah et al.

(10) Patent No.: US 10,590,545 B2
(45) Date of Patent: Mar. 17, 2020

(54) HIGH OR DIFFERENTIAL PRESSURE ELECTROLYSIS CELL

(71) Applicant: HYDROGENICS CORPORATION, Mississauga (CA)

(72) Inventors: Rami Michel Abouatallah, Toronto (CA); Rainey Yu Wang, Richmond Hill (CA); Nathaniel Ian Joos, Toronto (CA)

(73) Assignee: HYDROGENICS CORPORATION, Mississauga, CA (US)

( * ) Notice: Subject to any disclaimer, the term of this patent is extended or adjusted under 35 U.S.C. 154(b) by 283 days.

(21) Appl. No.: 15/276,040

(22) Filed: Sep. 26, 2016

(65) Prior Publication Data

US 2017/0088959 A1    Mar. 30, 2017

Related U.S. Application Data

(60) Provisional application No. 62/233,774, filed on Sep. 28, 2015.

(51) Int. Cl.
*C25B 1/12* (2006.01)
*C25B 1/10* (2006.01)
(Continued)

(52) U.S. Cl.
CPC ............... *C25B 1/12* (2013.01); *C25B 1/10* (2013.01); *C25B 9/08* (2013.01); *C25B 9/10* (2013.01); *H01M 8/023* (2013.01); *H01M 8/0273* (2013.01); *H01M 8/10* (2013.01); *Y02E 60/366* (2013.01)

(58) Field of Classification Search
None
See application file for complete search history.

(56) References Cited

U.S. PATENT DOCUMENTS 6,613,215 B2 *   9/2003   Molter ..................... C25B 1/10
                                                          204/263
7,432,008 B2    10/2008   Joos et al.
(Continued)

FOREIGN PATENT DOCUMENTS

| CA | 2857143 A1 | 6/2013 |
| CN | 103620090 A | 3/2014 |
| CN | 103988351 A | 8/2014 |

OTHER PUBLICATIONS

International Patent Application No. PCT/CA2016/051126, International Search Report and Written Opinion dated Nov. 1, 2016.
(Continued)

*Primary Examiner* — Harry D Wilkins, III

(57) ABSTRACT

An electrochemical cell has a membrane located between two flow field plates. On a first side of the membrane, there is a porous support surrounded by a seal between the membrane and the flow field plate. There is a gap between the porous support and the seal at the surface of the membrane. On a second side of the membrane, there is a seal between the membrane and the flow field plate located inside of the gap in plan view. The electrochemical cell is useful, for example, in high pressure or differential pressure electrolysis in which the second side of the membrane will be consistently exposed to a higher pressure than the first side of the membrane.

4 Claims, 1 Drawing Sheet

(51) Int. Cl.
*H01M 8/0273* (2016.01)
*H01M 8/023* (2016.01)
*C25B 9/10* (2006.01)
*H01M 8/10* (2016.01)
*C25B 9/08* (2006.01)

(56) References Cited

U.S. PATENT DOCUMENTS

| | | | | |
|---|---|---|---|---|
| 7,993,499 | B2* | 8/2011 | Zuber | C25B 9/10 204/252 |
| 9,828,682 | B2* | 11/2017 | Kawasaki | C25B 1/12 |
| 9,920,440 | B2* | 3/2018 | Gashi | C25B 9/206 |
| 2002/0079235 | A1* | 6/2002 | Molter | C25B 1/10 205/746 |
| 2002/0106551 | A1* | 8/2002 | Speranza | C25B 9/08 429/130 |
| 2002/0127462 | A1* | 9/2002 | Shiepe | C25B 9/04 429/511 |
| 2003/0003342 | A1 | 1/2003 | Sugita et al. | |
| 2003/0049518 | A1* | 3/2003 | Nanaumi | H01M 4/926 429/480 |
| 2007/0215461 | A1* | 9/2007 | Zuber | C25B 9/10 204/280 |
| 2008/0067061 | A1* | 3/2008 | Zuber | C25B 9/10 204/290.08 |
| 2013/0071769 | A1 | 3/2013 | Ikezoe et al. | |
| 2014/0027272 | A1* | 1/2014 | Blanchet | C25B 9/066 204/252 |
| 2014/0093811 | A1 | 4/2014 | Kiefer et al. | |
| 2014/0151217 | A1* | 6/2014 | Nakazawa | C25B 9/08 204/266 |
| 2014/0377682 | A1* | 12/2014 | Hirasawa | H01M 8/0297 429/482 |
| 2015/0114831 | A1* | 4/2015 | Kawasaki | C25B 9/10 204/252 |

OTHER PUBLICATIONS

U.S. Appl. No. 15/276,040, Non-Final Office Action dated Dec. 19, 2018.
U.S. Appl. No. 15/276,040, Non-Final Office Action dated Jun. 28, 2018.
European Patent Application No. 16849976.2, Extended European Search Report dated May 8, 2019.
Chinese Application No. 201680056515.0, Office Action dated May 10, 2019.
Chinese Application No. 201680056515.0, Office Action dated Dec. 11, 2019.

* cited by examiner

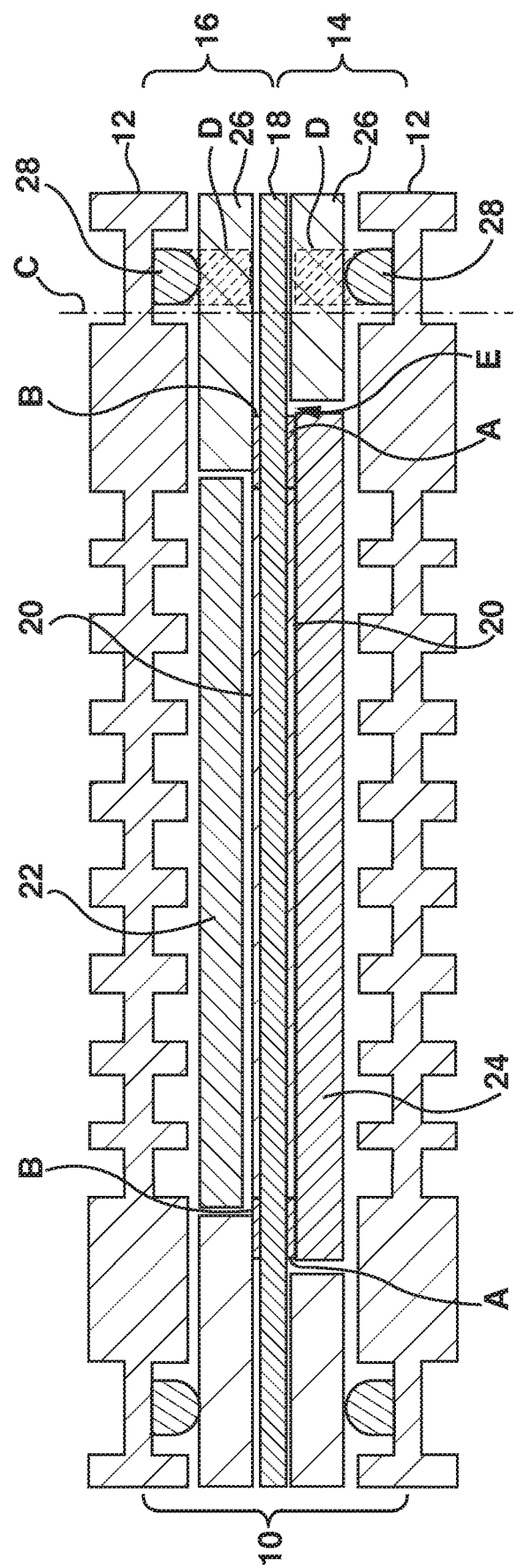

HIGH OR DIFFERENTIAL PRESSURE ELECTROLYSIS CELL

RELATED APPLICATIONS

This application claims the benefit of U.S. Provisional Application Ser. No. 62/233,774, filed on Sep. 28, 2015, which is incorporated herein by reference.

FIELD

This specification relates to electrochemical cells, in particular electrolysis cells.

BACKGROUND

Hydrogen fueling stations output hydrogen at high pressures, typically 350 to 700 bar. A significant amount of energy is consumed in operating compressors to reach the output pressure. In some cases, hydrogen is produced at the fueling station by electrolysis of water. Producing compressed hydrogen electro-chemically, in the electrolyser itself, consumes additional energy but less than the energy required for compression to the same pressure. In an energy storage application, producing hydrogen at 60-80 bar may allow hydrogen to be injected into a regional natural gas pipeline without further compression. Accordingly, it is generally desirable to produce hydrogen at above atmospheric pressure. However, increasing cost of the electrolysis unit may make it undesirable to produce hydrogen at the full pressure required for an application. In general, producing hydrogen by electrolysis at a pressure of about 40-80 bar is likely to be cost effective although electrolysis at high pressures, for example 120-350 bar, has also been proposed.

In some cases, both sides of an electrolysis cell are operated under pressure. This creates high-pressure oxygen, which enhances the risk of fire. In other cases, the electrolysis unit is operated at a differential pressure with the oxygen side operating at a lower pressure or even at atmospheric pressure. This is more electrically efficient, avoids producing high-pressure oxygen and allows the oxygen side balance of plant to be made of low-pressure materials.

Differential pressure electrolysis creates mechanical stress across the cell and challenges sealing systems to prevent leaks. Even in non-differential pressure cells, the hydrogen side of the electrolysis cell typically operates at a higher pressure than the oxygen side to avoid leakage of oxygen into the hydrogen. When the overall pressures are large, for example 120 bar or more, preserving this differential while accounting for fluctuations in pressures on either side of the cell can create substantial differential pressures across the cell, at least temporarily.

U.S. Pat. No. 7,432,008 describes an electrochemical cell with a membrane electrode assembly (MEA) located between first and second reactant flow field plates. A seal and gas diffusion layer (GDL) are located between the MEA and each flow field plate. In various embodiments, an edge portion of the GDL is non-porous and overlaps with the seal. The overlap is configured to eliminate or at least minimize a gap that would otherwise exist between the GDL and the seal and thereby counters a problem of having differential pressure distort the MEA into such a gap.

INTRODUCTION

This specification describes an electrochemical cell. The cell may be used in a proton exchange membrane (PEM) electrolysis cell, for example a high or differential pressure electrolysis cell. The cell could also be adapted for other electrochemical cells having a solid sheet form membrane.

The inventors have observed that the structures in U.S. Pat. No. 7,432,008 are limited in their ability to be adapted to high pressures. This is primarily because they rely on a portion of the gas diffusion layer being made non-porous and also, in some embodiments, compressing to participate in forming a seal. In cells that may be exposed to high differential pressures, the low pressure side of the membrane must be supported by a relatively incompressible porous support, for example sintered titanium. Such a support is at least difficult to make non-porous in a selected area and does not have good sealing qualities.

An electrolysis cell described herein has a membrane, which may have attached electrode/catalyst layers, located between two flow field plates. On the low-pressure side of the membrane, there is a porous support surrounded by a seal. The porous support and the seal are sandwiched between the membrane and the flow field plate. On the high-pressure side of the membrane, there is another porous support surrounded by a seal. The seal on the high-pressure side spans a gap between the porous support and the seal on the low-pressure side of the membrane. The structure of the cell helps prevent or reduce distortion of the membrane resulting from differential pressures by containing gas on the high-pressure side within (as seen in plan view) the gap on the low-pressure side.

In an example, an electrolysis cell has a membrane, which may have attached electrode/catalyst layers, located between two flow field plates. On the low-pressure side of the membrane, there is a porous support surrounded by a seal. The seal is made up of a frame, alternatively called a gasket, which is generally co-planar with the porous support and a supplementary seal that is compressed between the flow field plate and the frame. On the high-pressure side of the membrane, there is another porous support surrounded by a seal. The seal on the high-pressure side is also made up of a frame and a supplementary seal. The frame on the high pressure side spans a gap between the frame and the porous support on the low pressure side. This exemplary cell is intended for use in a differential pressure electrolyser that outputs hydrogen at 40 bar or more and oxygen generally at atmospheric pressure, or operates at higher pressures but with a similar pressure differential.

BRIEF DESCRIPTION OF THE FIGURES

FIG. 1 is a schematic cross section of an electrochemical cell.

DETAILED DESCRIPTION

FIG. 1 shows an electrochemical cell 10. The cell 10 is part of a larger cell stack that would be made by repeating the elements of the cell 10 and adding other elements, such as end plates, generally in the same way that conventional cell stacks are assembled. In the example shown, the cell 10 has bipolar flow field plates 12, which may be called just plates 12 for brevity. Alternatively, each plate 12 could be replaced by an anode flow field plate and a cathode flow field plate. The cell 10 may therefore be thought of as including only half of each plate 12 as indicated by the bracket in FIG. 1.

For the purposes of the following discussion, the cell will be described as oriented in FIG. 1. In this orientation, vertical dimensions are in the direction from one plate 12 towards the other, perpendicular to a plate 12. Horizontal, or plan view, dimensions are parallel to the plates 12.

The cell 10 is divided vertically by a membrane 18 into a first side 14, alternatively called the low pressure side, and a second side 16, alternatively called the high pressure side. Parts of the cell 10 within, or in direct contact with, either side may similarly be referred to as being first or second, or high pressure or low pressure, components.

In the example shown, the membrane 18 is a proton exchange membrane (PEM). The membrane 18 has catalyst layers 20 bonded to a central area (in plan view) of both of its sides. The catalyst layers 20 also contain conductive filaments or other materials and function as part of the electrodes of the cell 10. The membrane 18 may be referred to as a membrane electrode assembly (MEA). Alternatively, catalyst and conductive materials may be provided in separate layers.

On the low pressure side 14 of the cell 10, the membrane 18 is separated from part of the plate 12 containing the flow field by a first porous support 24. The first porous support 24 is relatively incompressible compared to other materials located between the plates 12. In the example shown, the first porous support 24 is made of sintered titanium with a nominal 0.01" (0.25 mm) thickness.

On the high pressure side 16 of the cell 10, the membrane 18 is separated from part of the plate 12 containing the flow field by a second porous support 22. The second porous support 22 is more compressible than the first porous support 24. In the example shown, the second porous support is a carbon felt, paper or cloth. The second porous support 22 is compressible to a thickness of 0.01" (0.25 mm) or less.

The porous supports 22, 24 are surrounded, as would be seen in plan view, by seals, specifically frames 26. Frames 26 function as gaskets sealing between the plates 12 and membrane 18. The porous supports 22, 24 are thereby contained within sealed cavities in the cell 10. The porous supports 22, 24 allow gasses to communicated between the flow fields of the plates 12 and the membrane 18 and also electrically connect the plates 12 to the catalyst layers 20. The frames 26 contain liquids and gasses within the cell 10, except at inlets and outlets to the cell 10 as known in the art. The frames 26 also help to electrically insulate the plates 12 from each other.

Optionally, supplementary seals 28 can be provided between the plates 12 and the frames 26. The plates 12 are typically made of metal and may have some surface imperfections. The supplementary seals 28 are made of a resilient material, relative to the frames 26, and may also be molded directly onto the plates 12. The supplementary seals 28 help ensure that gas does not escape though any imperfect seal between a frame 26 and plate 12, for example along a scratch in the plate 12. However, the primary seal is made between the plate 12 and the frame 26.

In the cell 10, there is a gap E in the materials at the surface of the low pressure side of the membrane 18. In the example shown, the gap E is created between the first porous support 24 and the first frame 26. The membrane 18 is protected against being pushed into this gap by gas on the high pressure side of the cell 10 by having the inside edge of the seal on the high pressure side of the cell 10 (produced by the second frame 26) be horizontally inside of the gap E. Although only one horizontal dimension of the cell 10 is shown, the high pressure side seal is preferably inside of the gap E in all horizontal dimensions, i.e. the gap E is entirely outside of the high pressure side seal in a plan view of the cell 10. This relative positioning applies in particular to the seal formed against the surface of the membrane 18 on the high pressure side of the cell 10. As discussed above, the seal between the frame 26 and the plate 12 on the high pressure side may be imperfect, but the presence of high pressure gas is limited to areas of imperfection in the surface of the plate 12 and the frame 26 helps resist the pressure of the gas in these areas.

Various alternative embodiments may also be constructed. In one alternative, the catalyst layer 20 on the low pressure side is extended towards the edges of the first porous support 24, for example as shown at A in FIG. 1. The catalyst layer 20 does not necessarily extend all the way to the edge of the first porous support 24 but may instead extend only as required to overlap with the frame 26 on the high pressure side. Although the catalyst layer 20 has very little thickness, this extension may help in forming a stronger seal between the membrane 18 and the frame 26 on the high pressure side of the cell 10. Similarly, the catalyst layer 20 on the high pressure side may be extended, for example as shown at B, to overlap with the frame 26 on the high pressure side, with or without also extending the catalyst layer 20 on the low pressure side of the cell 10.

In other alternatives, one or both of the frames 26 may have their edges withdrawn from the edge of the corresponding plate 12, for example to the line C shown in FIG. 1. In this case, the corresponding supplementary seal 28 may be extended as shown at D to bear directly against the membrane 18. In another alternative, supplementary seals 28 are omitted. However, the configuration shown in FIG. 1 is preferred. As discussed above, on the high pressure side of the cell 10, the seal between the frame 26 and the plate 12 may be compromised by any surface imperfection in the rigid plate 12. The supplementary seal 28 provides a more resilient surface for the top side of the frame 26 to seal against. In the event that some high pressure gas might pass line C, it is preferable for the membrane 18 to be supported by a complete and unbroken surface of the frames 26, or at least by the frame 26 on the low pressure side.

In another alternative, the second porous support 22 and the frame 26 on the high pressure side may be one integrated component, for example a porous support with an impermeable border. However, the inventors are not aware at the time of writing this specification of a suitable material for an integrated porous support and frame that would be able to seal against pressures of 40 bar or more on the high pressure side of the cell 10. Accordingly, this option is not currently preferred since it might require, for example, reducing the frame 26 on the high pressure side only to line C and relying on second supplementary seal 28 to resist most of the pressure applied to the high pressure side.

In another alternative, the supplementary seal 28 on the high pressure side of the cell could be placed over or inside of (in plan view) the gap E. Any one or more of the various alternatives described above could also be combined to produce further alternatives.

We claim:
1. An electrochemical cell comprising,
   first and second flow field plates;
   a membrane located between the flow field plates, the membrane having a first side and a second side;
   a first porous support between the first side of the membrane and the first flow field plate;
   a first seal surrounding the first porous support, there being a gap between the first porous support and the first seal at the first side of the membrane;

a second seal between the second side of the membrane and the second flow field plate, wherein at least part of the second seal is located inside of the gap in plan view;

wherein the second seal comprises a frame having a portion that extends inside of the gap in plan view such that at least part of the second seal is located inside of the gap in plan view and overlaps the gap;

a first catalyst layer located on the first side of the membrane, and a second catalyst layer located on the second side of the membrane, wherein at least the second catalyst layer extends to overlap with the portion of the frame that extends inside of the gap.

2. The cell of claim 1 further comprising a second porous support between the second side of the membrane and the second plate, the second porous support located inside of the second seal in plan view.

3. The cell of claim 1 wherein the first porous support is more rigid than the first seal or second seal.

4. The cell of claim 1 wherein the second seal comprises a supplementary seal located between the second side of the membrane and the second flow field plate outside of the gap.

* * * * *